Dec. 30 3,486,829

Filed Sept. 15, 1965 Sheets-Sheet 1

INVENTOR
PAUL A. WILKS, JR
BY
Roberts Smythe & Bryan
ATTORNEYS

INVENTOR
PAUL A. WILKS, Jr.
BY
ATTORNEYS 3,486,829
MULTIPLE TOTAL INTERNAL REFLECTION CELL
WITH COOLING MODULE
Paul A. Wilks, Jr., Darien, Conn., assignor to Wilks
 Scientific Corporation, Norwalk, Conn., a corporation
 of Connecticut
Filed Sept. 15, 1965, Ser. No. 487,471
Int. Cl. G01n 1/10, 21/34; G01j 3/02
U.S. Cl. 356—246					4 Claims

ABSTRACT OF THE DISCLOSURE

A spectroscopy apparatus having at least a pair of parallel total internal reflection plates and having the sample to be analyzed trapped therebetween. The sample can be made relatively thin and the number of reflections from both plates through the same thickness of sample result in more energy being obtained.

---

This invention relates to spectroscopy, and particularly to an improved capillary internal reflection cell for use in the analysis of samples by internal reflection spectroscopy, also known as "frustrated multiple internal reflection spectroscopy" or "attenuated total reflection spectroscopy."

Internal reflection spectroscopy is based on the fact that a portion of the energy in a radiation beam being totally internally reflected in a transmitting medium or plate, escapes from the medium and then is returned into the medium with each reflection. If an absorbing sample is brought into contact with the medium, radiation will be absorbed at wave lengths where the sample absorbs in much the same fashion as in transmission spectroscopy.

The amount of absorption of energy by the sample depends upon the reflective indices of refraction of the transmitting medium and the range, the angle of incidence of the radiation beam as it strikes the reflecting surface, and the number of reflections of the radiation beam from the reflecting face or faces of the reflecting medium in contact with the sample.

A single plate has been employed as the transmitting medium, the plate having beveled edges and parallel faces extending therebetween. A ray of the source is arranged to strike one of the beveled faces at an angle greater than the critical angle, causing the ray to be transmitted into the transmitting medium, less a reflection loss which is a function of the index of refraction of the medium. When the radiation beam reaches one of the parallel faces, it will strike that face at less than the critical angle and will be totally internally reflected to the other parallel face. The beam again will be totally reflected back to the initial face down the medium until it reaches the beveled edge opposite that at which the radiation beam entered the medium. At this point it will pass out of the plate or medium and to the indicating or recording means.

If a sample of material is brought into contact with the exposed parallel faces of the plate, the beam will penetrate a small amount, in the order of the wave length of the radiation, into the sample with each reflection and the radiation will be absorbed at those wave length where the sample absorbs. Although the penetration into the sample is so slight, the amount of absorption is small but is multiplied by the number of reflections. To increase the number of reflections, the plate may be either increased in length or made thinner.

The space normally available in sampling systems of known spectrometers provides a limitation upon the length that the transmission medium may extend. Additionally, there is a limitation on the thinness of the plate medium that can be tolerated, since the size of the beveled entrance face with respect to the image of the source ray focused on it limits the energy that it can accept, and the level of the system drops off rapidly despite the increased number of reflections.

The principal object of the invention is to provide a system of internal reflection spectroscopy that will overcome the above and other difficulties of known systems.

Another object of the invention is to provide an internal reflection cell having a greater number of reflections and hence a greater sensitivity than known reflection cells.

Still another object of the invention is to provide such a capillary internal reflection cell capable of making spectrographic studies of thin layers on films.

A further object of the invention is to provide such a capillary internal reflection cell capable of making spectrographic studies of materials which by their shape or hardness make poor contact with internal reflection plates.

A still further object of the invention is to provide such a capillary internal reflection cell capable of making analysis of minute quantities of material condensed on the surfaces of the internal reflection medium from gas streams such as the effluent from gas chromotograph.

In one aspect of the invention, a capillary internal reflection cell may comprise a plurality of plates capable of transmitting radiation rays, which plates are stacked one on top of the other. Two opposite edges of these plates may be beveled such that the bevel on one of the plates is coextensive with the bevel on the other.

In another aspect of the invention, a sample to be analyzed may be located between the plates and held in a manner such that a minute film of constant thickness is provided between the stacked plates. The faces of the plates are parallel, and a source of radiant energy is arranged such that rays therefrom will pass into the coextensive beveled edges of the plates at an angle greater than the critical angle so that the rays are transmitted into the transmitting medium in the form of plates, less a reflection loss which is a function of the index of refraction of the plate medium. When, however, the radiation beam reaches one of the parallel faces of each plate, it will strike it at an angle less than the critical angle and hence be totally internally reflected to the opposite face of the respective plates. Again, the beam will be totally reflected back to the first face of each plate a plurality of times until the beams reach the opposite beveled edges at which point they will pass out of the plates.

In a further aspect of the invention, a reflection spectrophotometer may be arranged to receive the outgoing beams where it will produce a spectrum which can be compared with a conventional transmission curve.

In a still further aspect of the invention, a solid-state fraction trapping unit may be provided for trapping fractions of a sample to be analyzed.

In another aspect of the invention, the analyzer may comprise a base or cooling module which supports the lower reflective plate of a capillary internal reflection cell. The upper plate of the capillary cell may be mounted in a frame that is hinged to the base and is adapted to be opened and closed, thereby separating the two plates, when the unit is held with the open end facing the exhaust of a chromatograph, thereby receiving the exhaust carrier gas through a delivery head extended between the reflector plates of the capillary cell. In this way, the internal volume bounded by the reflector plates will be continuously flushed by the carrier for that gas to prevent the entry and condensation of atmospheric moisture. As the desired fraction leaves the exhaust of the chromatograph, it condenses between the two reflector plates of the capillary cell.

In another aspect of the invention, threaded means may be provided in the hinged frame member supporting the upper transmission plate medium for locking the frame to the base, and with the upper and lower plate media in contact with each other and trapping the sample to be analyzed.

In a still further aspect of the invention, the base and frame member may be provided with openings extending therethrough so that additional layers of the sample to be analyzed may be located on the exposed surfaces of the plate transmission media. In this way, greater sensitivity of the cell is achieved since three layers of the sample absorb portions of the transmitted ray passing through the cell, consequently providing an increase in the definition of the spectrum from the material being analyzed.

The above, other objects and novel features of the invention will become apparent from the following specification and accompanying drawings which are merely exemplary.

Figure 1:
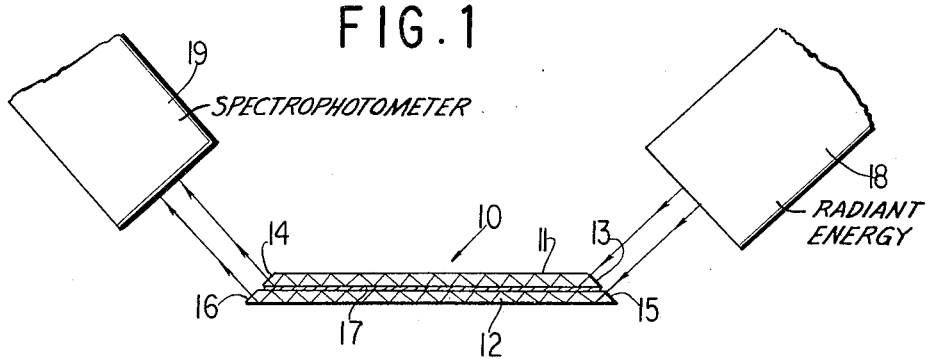
FIG. 1 is a schematic showing of a capillary internal reflection cell embodying a two-plate transmission medium between which is trapped a layer of a sample to be analyzed.

Referring to the drawings, and particularly to FIG. 1, the principles of the invention are shown as applied to a capillary internal reflection cell 10 including two internal reflection transmission plates 11 and 12. The plates 11 and 12 may include parallel top and bottom surfaces. The ends of plate 11 may be beveled at 13 and 14, and the plate 12 may be beveled at 15 and 16. The bevels 13 and 15 are shown as being coextensive as are the bevels 14 and 16. The thickness of the sample 17 is uniformly distributed between the transmission plates 11 and 12, and it may be as thin as two microns.

A source of radiant energy 18 may be arranged at one side of the plates 11 and 12 such that beams from the source 18 approach the beveled surfaces 13, 15 at an angle greater than the critical angle, causing the radiant beam to be transmitted into the transmitting media 11 and 12 through the beveled edges 13 and 15. The radiant energy may, for example, be infrared. When the beams from the source 18 strike the lower faces of the plates 11 and 12, they do so at an angle less than the critical angle, and hence are totally internally reflected to the upper faces of the plates 11 and 12, where they strike the upper faces at an angle less than the critical angle and are again internally reflected back to the bottom faces of the plates 11 and 12. This continues throughout the length of the plates 11 and 12, and the beams exit from plates 11 and 12 through the beveled edges 14 and 16 and then pass into a conventional spectrophotometer 19. An example thereof is one designated as Model 21, made by Perkin-Elmer Corporation.

As the radiant beams are internally reflected many times within the plates 11 and 12, each time they are reflected from the surface of plates 11 and 12 in contact with the sample 17, the sample will absorb a slight amount of the energy at those wave lengths where the sample absorbs. However, inasmuch as there is provided a great number of reflections within the plates 11 and 12, and each acts on the sample 17, the result of the radiant beam passing into the spectrophotometer 19 is to provide a well defined spectrum from a very small volume of material 17, and which spectrum can be compared directly with a conventional transmission curve.

Figure 2:
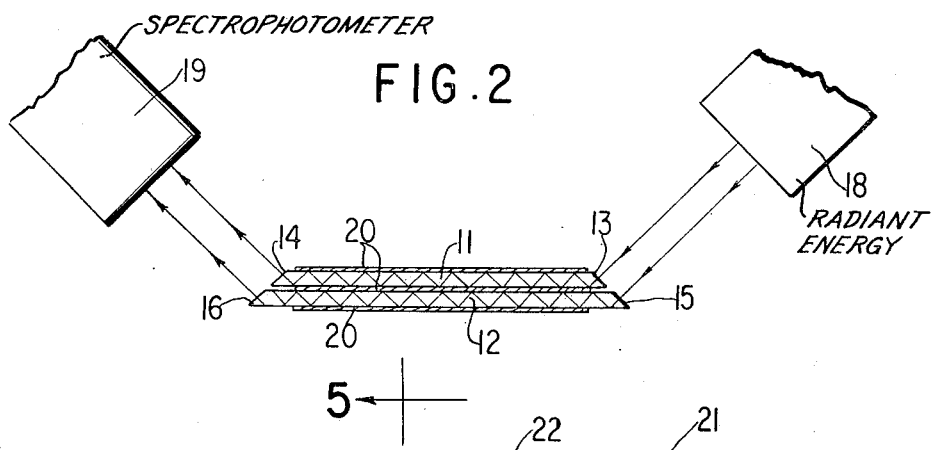
FIG. 2 is a view similar to FIG. 1 in which layers of the sample to be analyzed are located not only between the two parallel transmission plate media, but also on the exposed surfaces thereof to thereby increase the definition of the spectrum within the spectrophotometer.

Referring to FIG. 2, the schematic showing is similar to that of FIG. 1 wherein a sample 20 is not only provided between the plates 11 and 12 but also on the exposed surfaces thereof, thereby providing a greater absorption of the radiant energy by the sample, and consequently rendering the apparatus more sensitive.

Figure 3:
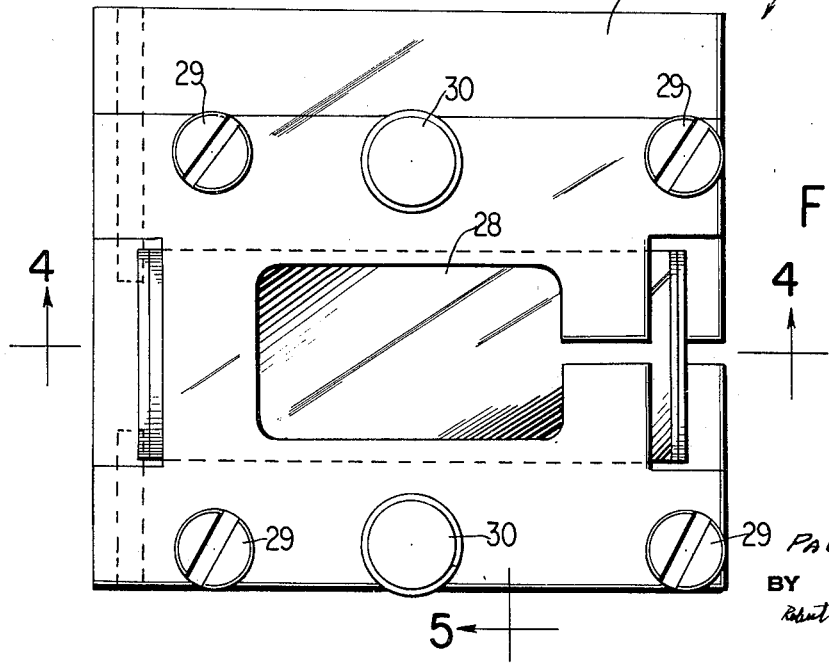
FIG. 3 is a top plan view of a hand-held device that supports the type of cell shown in FIGS. 1 and 2.
Figure 4:
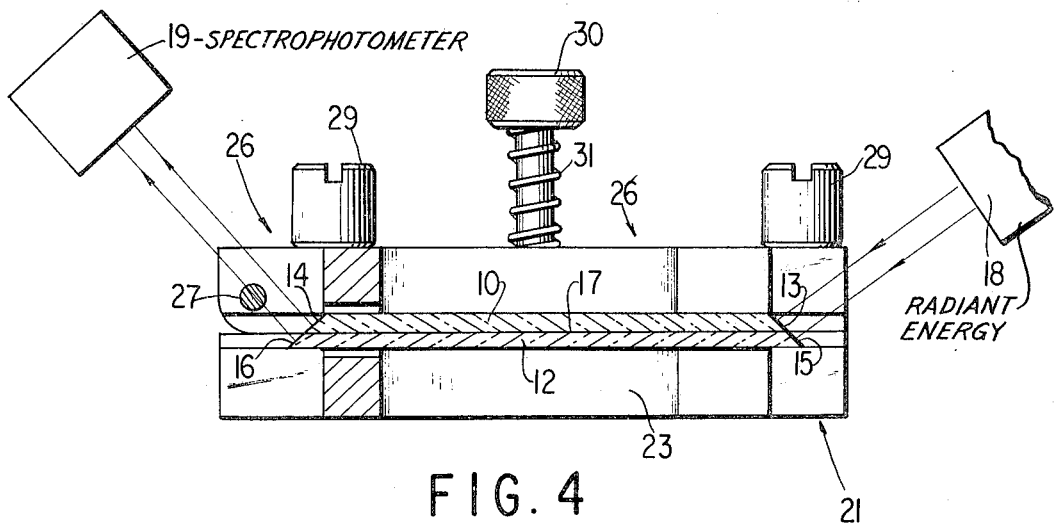
FIG. 4 is a sectional elevational view taken substantially along line 4—4 of FIG. 3.
Figure 5:
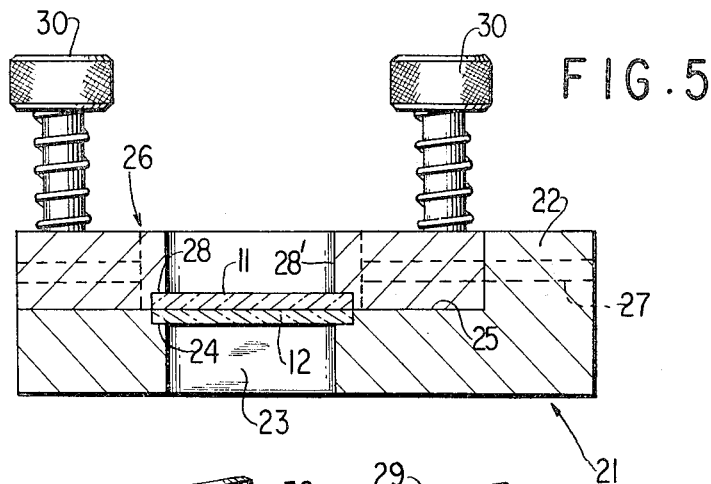
FIG. 5 is a sectional elevational view taken substantially along line 5—5 of FIG. 3.

Referring to FIGS. 3, 4 and 5, an analyzer is shown. It may comprise a base 21 having a flange 22 at one of its sides. The base 21 may be provided with a through opening 23 having a shouldered recess 24 extending along the longitudinal sides of the opening 23 for the reception of the internal reflection transmitting plate 12. Plate 12 may be securely fastened to the base 21.

A frame 26 may be located on top of the top surface 25 of the base 21 with its one side against the inner edge of the flange 22. The frame 26 may be pivoted to base 21 through a pin 27 extending htrough the flange 22 and into the frame 26. The frame 26 may also include a shouldered portion 28 about a through opening 28′ adapted to hold the top plate 11, and when the frame 26 is pivotally closed, the plates 11 and 12 contact each other in a uniform manner such that thin layers of a sample 17, in the order of two microns in thickness, may be trapped therebetween.

In order to secure the frame 26 to the base 21, four screws 29 may be located at the four corners of frame 26, which screws take into the base 21.

Figure 6:
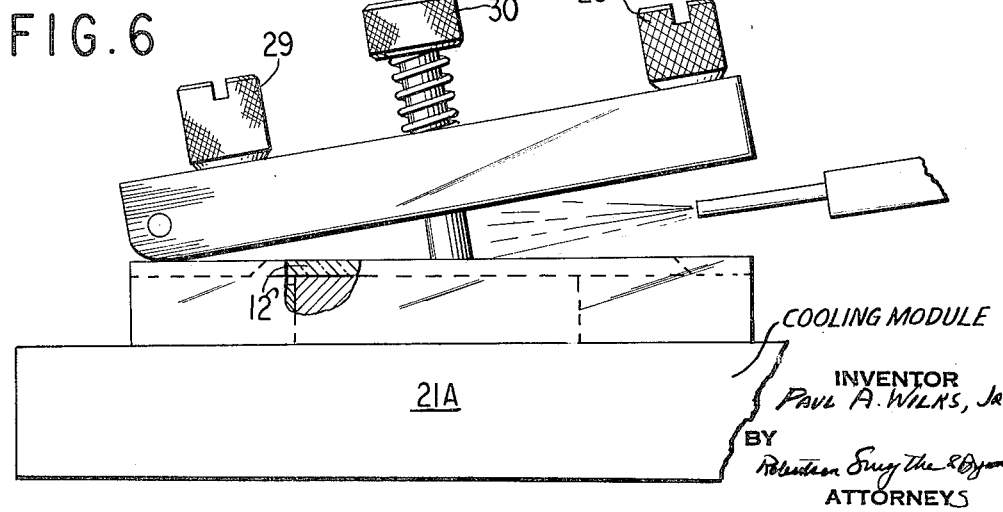
FIG. 6 is a view of the device of FIG. 3, shown with a charging head arranged with the device open.

A thermo-electric cooling module 21A (FIG. 6) may rest in contact with the lower reflector plate 12 of the capillary internal reflection cell 10, so that it may be cooled to a temperature in the vicinity of $-10°$ C, within a short time in the order of about 30 seconds. Screws 30 are used to hold the entire cell against the cooling module. They have springs 31 so that the cell can be opened while against its module. When it is desired to trap a specimen a few microns thick, the capillary cell is opened as above described and its open end is located adjacent the exhaust of a chromatograph (FIG. 6) so that the exhaust carrier gas continuously flushes the volume bounded by the reflector plates, thus preventing the entry and condensation of atmospheric moisture.

As the desired fraction leaves the exhaust, it condenses between the two reflector plates of the capillary cell 10. The thermo-electric cooling improves the efficiency of condensation even for high boilers, and prevents the condensate from being swept away by the carrier gas. After the fraction has eluted, the delivery head is released, the cell is closed tightening the crews 29 and 30, whereupon it is removed and is then ready for the spectrophotometer.

Placing the cell in the spectrophotometer so that the source 18 acts on the beveled edges 13 and 15 causes the source radiant energy to be internally reflected throughout the length of plates 11 and 12, and each reflection in each plate from the surfaces adjacent the sample 17 will be reduced or "frustrated" at those wave lengths where the material absorbs. This absorption takes place with each reflection with the result that a very thin film of molecules can give rise to a strong absorption spectrum as a result of the numerous reflections in a typical plate. Particularly in the present invention where a plurality of stacked plates is employed, the number of reflections accordingly is greatly increased so that the sensitivity of the cell is far greater than that of known devices of this type. As the radiant energy passes out of the plates 11 and 12 through the beveled surfaces 14 and 16, it is directed into the spectrophotometer 19 where a well defined spectrum from a very small volume of material can be compared directly with a conventional transmission curve.

As an example of sensitivity, when 0.4 microliter of some liquid such as GC fraction is deposited over the reflectors in a relatively uniform thickness of two microns (0.002 mm.), the internal reflection spectrum obtained will approach in appearance the transmission curve of the same sample contained in a 0.03 mm. transmission cell.

In trapping and analyzing fractions with the capillary internal reflection cell of this invention, two important objectives are achieved, i.e., greater sensitivity than conventional methods without the use of a beam condenser, and a practical device for collecting the fraction directly. It eliminates the time-consuming steps of transferring fractions, wherein a good portion of the fraction is often lost.

Although the various aspects of the improved capillary internal reflection cell have been shown and described in detail to fully disclose one embodiment of the invention, it is evident that changes may be made in such details, and certain features may be used without others without departing from the principles of the invention.

What is claimed is:

1. An internal reflection cell comprising in combination, a base; a plate having parallel top and bottom surfaces, composed of a material capable of total internal reflection and including opposed transverse edges at an angle related to said parallel top and bottom surfaces supported in said base with said transverse edges exposed; a frame pivoted to said base; another plate having parallel top and bottom surfaces, composed of a material capable of total internal reflection and including exposed opposed transverse edges at an angle related to said parallel top and bottom surfaces, and coextensive with those on the plate in said base; and means for holding said pivotal frame in contact with said base such that said parallel surfaces lie in the same plane to trap a sample therebetween.

2. An internal reflection cell comprising in combination, a base having a through opening therein a plate having parallel top and bottom surfaces, composed of a material capable of total internal reflection and including opposed transverse edges at an angle related to said parallel top and bottom surfaces supported in said base with said transverse edges exposed, said plate covering said through opening; a frame pivoted to said base; another plate having parallel top and bottom surfaces, composed of a material capable of total internal reflection and including exposed opposed transverse edges at an angle related to said parallel top and bottom surfaces and parallel to those on the plate in said base; and means for holding said pivotal frame in contact with said base such that said parallel surfaces lie in the same plane to trap a sample therebetween.

3. An internal reflection cell comprising in combination a base having a through opening therein; a plate having parallel top and bottom surfaces, composed of a material capable of total internal reflection and including opposed transverse edges at an angle related to said parallel top and bottom surfaces supported in said base with said transverse edges exposed, and covering said through openings; a frame having a through opening therein, pivoted to said base; another plate having parallel top and bottom surfaces, composed of a material capable of total internal reflection and including exposed opposed transverse edges at an angle related to said parallel top and bottom surfaces, and parallel to those on the plate in said base, said plate covering said through opening in said frame; and means for holding said pivotal frame in contact with said base such that said parallel surfaces lie in the same plane to trap a sample therebetween.

4. An internal reflection cell comprising in combination, a base having a through opening therein; a plate having parallel top and bottom surfaces, composed of a material capable of total internal reflection and including opposed transverse edges at an angle related to said parallel top and bottom surfaces supported in said base with said transverse edges exposed, and covering said through opening; a frame having a through opening therein, pivoted to said base; another plate having parallel top and bottom surfaces, composed of a material capable of total internal reflection and including exposed opposed transverse edges at an angle related to said parallel top and bottom surfaces, and parallel to those on the plate in said base, said plate covering said through opening in said frame; means for holding said pivotal frame in contact with said base such that said parallel surfaces lie in the same plane to trap a sample therebetween; a cooling module in contact with one of said plates; and means for resiliently holding said cell against said cooling module such that said base and frame can be separated.

References Cited

UNITED STATES PATENTS

| 2,015,949 | 10/1935 | Maw. | |
| 2,056,791 | 10/1936 | Logan. | |
| 2,819,402 | 1/1958 | Watson et al. | |
| 3,308,709 | 3/1967 | Harrick | 350—96 X |
| 3,433,570 | 3/1969 | Hansen | 356—74 X |

OTHER REFERENCES

Harrick: "Total Internal Reflection and Its Application to Surface Studies," Annals of the New York Academy of Sciences, vol. 101, p. 948 relied on.

Hansen et al.: "Spectrometer Cells for Single and Multiple Internal Reflection Studies in Ultraviolet, Visible, Near Infrared, and Infrared Spectral Regions," Analytical Chemistry, vol. 36, No. 4, April 1964, pp. 783–787.

Hansen: "A New Spectrophotometric Technique Using Multiple Attenuated Total Reflection," Analytical Chemistry, vol. 35, No. 6, May 1963, pp. 765 and 766.

RONALD L. WIBERT, Primary Examiner

F. L. EVANS, Assistant Examiner

U.S. Cl. X.R.

250—83.3; 350—96; 356—51, 74